US 6,613,190 B2

(12) United States Patent
Omori et al.

(10) Patent No.: US 6,613,190 B2
(45) Date of Patent: Sep. 2, 2003

(54) METHOD OF AND APPARATUS FOR MANUFACTURING TANTALUM SOLID ELECTROLYTIC CAPACITORS

(75) Inventors: Minoru Omori, Kyoto (JP); Yoshitsugu Uenishi, Ikoma (JP); Osamu Tomita, Kyoto (JP); Nario Kawakita, Uji (JP); Masakuni Ogino, Katano (JP); Yoji Masuda, Uji (JP); Tsuyoshi Yoshino, Kameoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/162,574

(22) Filed: Jun. 6, 2002

(65) Prior Publication Data

US 2003/0000057 A1 Jan. 2, 2003

Related U.S. Application Data

(62) Division of application No. 09/712,158, filed on Nov. 15, 2000, now Pat. No. 6,423,104.

(30) Foreign Application Priority Data

Nov. 19, 1999 (JP) .......................................... P 11-329496

(51) Int. Cl.$^7$ ............................................. B30B 15/34
(52) U.S. Cl. .................. 156/583.8; 156/581; 156/583.1
(58) Field of Search ................................. 156/500, 537, 156/580, 581, 583.1, 583.8; 264/272.11, 272.18; 100/315, 326, 233

(56) References Cited

U.S. PATENT DOCUMENTS

| 4,510,554 | A | * | 4/1985 | Irikura ........................ 361/433 |
| 5,781,401 | A | | 7/1998 | Tomiyasu et al. ........... 361/303 |
| 6,343,005 | B1 | * | 1/2002 | Tadanobu et al. ........... 361/532 |
| 6,423,104 | B1 | * | 7/2002 | Omori et al. ............... 29/25.03 |
| 6,493,214 | B1 | * | 12/2002 | Kanetake et al. ........... 361/531 |

FOREIGN PATENT DOCUMENTS

JP            4-53116     2/1992

\* cited by examiner

*Primary Examiner*—James Sells
(74) *Attorney, Agent, or Firm*—Wenderoth, Lind & Ponack, L.L.P.

(57) ABSTRACT

A length of metallic lead from having anode terminals and cathode terminals integrally formed with each other extends between upper and lower molds of an apparatus for manufacturing tantalum solid electrolytic capacitors. The cathode terminals are first coated with a thermosetting conductive adhesive, and cathode layers of capacitor elements are then placed on the conductive adhesive. Thereafter, anode leads extending outwardly from the capacitor elements are placed on the anode terminals are joined thereto, respectively, by welding. A pressure is applied to the capacitor elements so that a portion of the conductive adhesive is squeezed out from one surface of each of the plurality of capacitor elements to a neighboring side surface thereof. The cathode terminals are then joined to the capacitor elements, respectively, by heat-curing the conductive adhesive, and the capacitor elements are finally covered with a sheathing resin.

20 Claims, 7 Drawing Sheets

METHOD OF AND APPARATUS FOR MANUFACTURING TANTALUM SOLID ELECTROLYTIC CAPACITORS

This application is a divisional of U.S. application Ser. No. 09/712,158, filed Nov. 15, 2000, now U.S. Pat. No. 6,423,104.

BACKGROUND OF THE INVENTION

1. Field of the Invention

The present invention relates generally to a tantalum solid electrolytic capacitor and, in particular but not exclusively, to a method of and an apparatus for manufacturing tantalum solid electrolytic chip capacitors for use in various electronic appliances.

2. Description of the Related Art

Recently, with a tendency to reduce the weight and size, with a tendency to enhance the performance, and with the development of a packaging technique, the number of electronic appliances that are former into chips is rapidly increasing. Also, in the field of solid electrolytic capacitors, with a tendency to reduce the size and increase the capacity, the number of the solid electrolytic capacitors that are formed into chips is increasing. However, a further reduction in size and a further increase in capacity are demanded.

Figure 9:
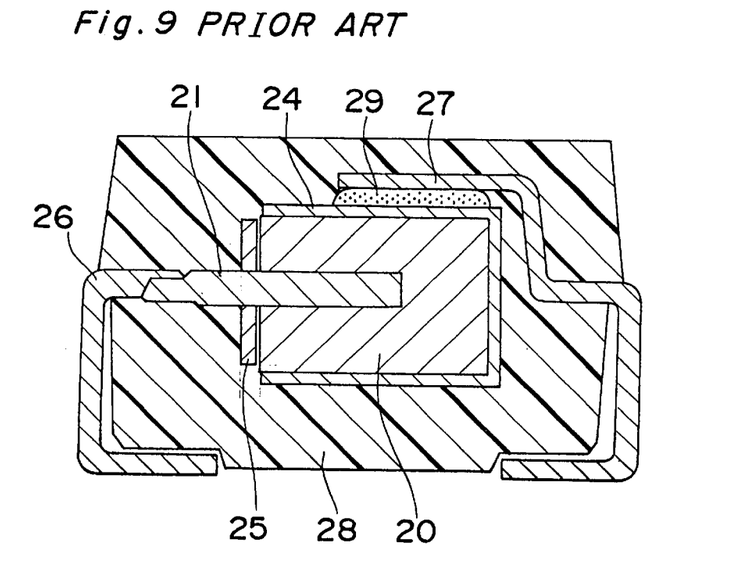
FIG. 9 is a view similar to FIG. 2, but depicting a tantalum solid electrolytic capacitor manufactured by a conventional method.
Figure 10A:
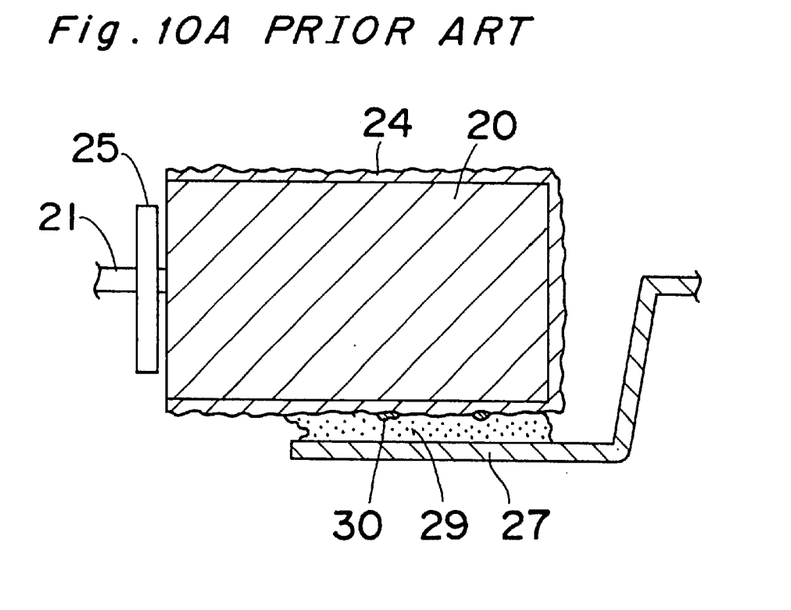
FIG. 10A is a sectional view of a main portion of the tantalum solid electrolytic capacitor of FIG. 9.
Figure 10B:
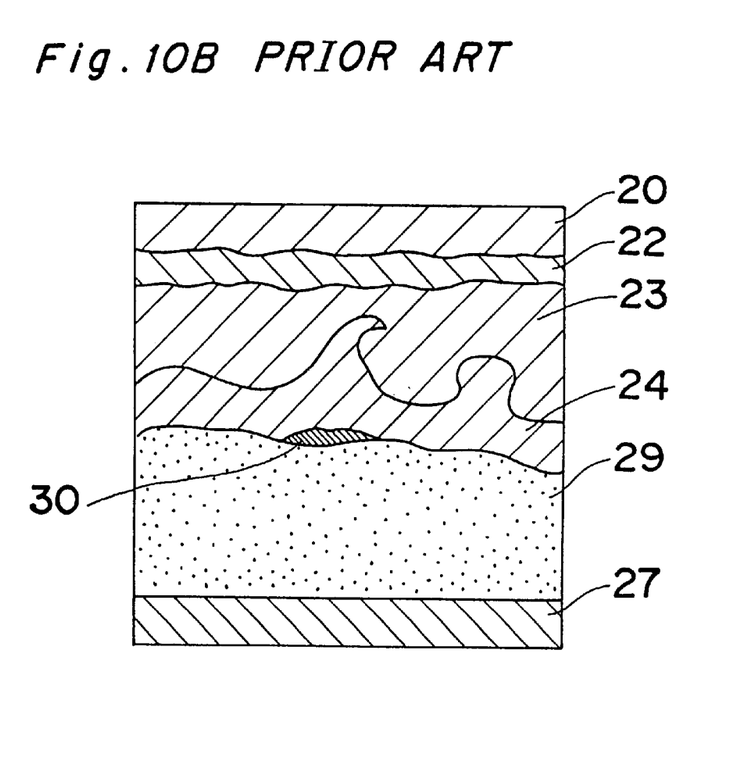
FIG. 10B is a sectional view, on an enlarged scale, of the main portion of FIG. 10A.

FIG. 9 depicts a conventional tantalum solid electrolytic chip capacitor, while FIGS. 10A and 10B depict an essential portion of a tantalum solid electrolytic capacitor made by a conventional manufacturing method after assemblage.

In these figures, reference numeral 20 denotes a capacitor element, which is a sintered porous body formed of powder of tantalum metal, one of valve action metals. An anode lead 21 made of a tantalum wire is partially embedded in and extends outwardly from the porous body. A dielectric oxide layer 22 is formed on a portion of the anode lead 21 and over the entire surface of the porous body by anodizing. An electrolyte layer 23 such as manganese dioxide or the like is formed on the surface of the dielectric oxide layer 22, and a cathode layer 24 is further formed on the electrolyte layer 23. The cathode layer 24 includes a carbon layer and a silver paste layer laminated one upon another by dipping. Reference numeral 25 denotes a Teflon-made insulating plate mounted on the anode lead 21 to prevent an electrolyte from reaching and adhering to the anode lead 21 during formation of the electrolyte layer 23. Reference numeral 26 denotes an anode terminal, which is connected to the anode lead 21 by welding and is bent after formation of a sheathing resin 28 (explained later). Reference numeral 27 denotes a cathode terminal electrically connected to the cathode layer 24 of the capacitor element 20 via a thermosetting conductive adhesive 29 made of epoxy resin, which is cured by a hot-air circulating dryer. The cathode terminal 27 is bent after the molding of the sheathing resin 28. The sheathing resin 25 is covered over the entire capacitor element 20 by molding.

In the conventional tantalum solid electrolytic capacitor of the above-described construction, the conductive adhesive 29 used to connect the cathode terminal 27 to the cathode layer 24 of the capacitor element 20 is cured by the hot-air circulating dryer during batch processing wherein the conductive adhesive 29 is allowed to stand for 90 minutes in an atmosphere of 180±5° C. Accordingly, such much time as about 6 hours is required from the start of assembling to the end of curing of the adhesive, including the time required for increasing the temperature of a product from when the product is introduced into the hot-air circulating dryer to when it reaches 180±5° C., the curing time of 90 minutes, and the annealing or slow cooling time up to when the product is taken out to the room temperature. According to this manufacturing method, the conductive adhesive 29 is first discharged on the cathode terminal 27, and the capacitor element 20 is then placed on the conductive adhesive 29. Thereafter, the capacitor element 20 is temporarily fixed by connecting the anode lead 21 to the anode terminal 26, and the curing is carried out using the hot-air circulating dryer. Thus, the capacitor element 20 is merely placed on the conductive adhesive 29, which in turn comes to have a thickness of about 100 μm to about 500 μm, resulting in an increase in apparent resistance of the conductive adhesive itself. Furthermore, as shown in FIG. 10B, it is likely that air is drawn into an interface between the capacitor element 20 and the conductive adhesive 29 to create air bubble portions 30. The presence of the air bubble portions 30 increases the connection resistance, deteriorating the electric characteristics (tan δ/1 KHz or ESR/100 KHz) required for a capacitor.

Furthermore, as shown in FIG. 9, because the conductive adhesive 29 is merely coated on the cathode terminal 27, the bonding area between the cathode terminal 27 and the capacitor element 20 is-small and, hence, the bonding strength is low, resulting in insufficient reliability.

SUMMARY OF THE INVENTION

The present invention has been developed to overcome the above-described disadvantages.

It is accordingly an objective of the present invention to provide a method of and an apparatus for stably manufacturing tantalum solid electrolytic capacitors that are superior in electric characteristics (tan δ/1 KHz or ESR/100 KHz).

Another objective of the present invention is to provide the method and apparatus of the above-described type that are superior in productivity.

In accomplishing the above and other objective, the method according to the present invention comprises: preparing a length of metallic lead frame having a plurality of anode terminals and a plurality of cathode terminals; coating the plurality of cathode terminals with a thermosetting conductive adhesive; placing cathode layers of a plurality of capacitor elements on the conductive adhesive; placing anode leads 25 extending outwardly from the plurality of capacitor elements on the plurality of anode terminals respectively; joining the anode leads to the plurality of anode terminals respectively, by welding; applying a pressure to the plurality of capacitor elements so that a portion of the conductive adhesive is squeezed out of one surface of each of the plurality of capacitor elements to a neighboring side surface thereof joining the plurality of cathode terminals to the plurality of capacitor elements, respectively, by heat-curing the conductive adhesive; and covering the plurality of capacitor elements with a sheathing resin.

According to the above-described method, the pressure applied to the capacitor elements moves a portion of the conductive adhesive to the neighboring side surface of each capacitor element, thereby causing the conductive adhesive layer to have a reduced thickness. As a result, the resistance of the conductive adhesive in the thickness direction reduces considerably, and the adhesion properties between the surface of the cathode layer of the capacitor element and the surface of the cathode terminal are improved. Unlike the conventional method, any air bubbles are not produced and, hence, the electric characteristics (tan δ/1 KHz or ESR/100 KHz) are improved. Moreover, the use of an adhesive that cures within a short time enables successive curing within the manufacturing apparatus, compared with the conventional batch processing by the use of a hot-air circulating dryer, thus enhancing the productivity.

Preferably, the pressure applied to the plurality of capacitor elements ranges from 2 kg/cm² to 9.5 kg/cm² in terms of leakage current.

Advantageously, an epoxy-based adhesive is used for the conductive adhesive, and the conductive adhesive has a thickness smaller than 100 μm after the application of the pressure. The use of the epoxy-based adhesive enables curing within a very short time and enhances the productivity, and the reduced thickness of the conductive adhesive reduces the resistance of the conductive adhesive.

On the other hand, the apparatus according to the present invention includes a lower mold having an upper surface, on which a length of metallic lead frame having a plurality of anode terminals and a plurality of cathode terminals is to be placed, an upper mold mounted on the lower mold and having a lower surface spaced from the upper surface of the lower mold, and a heater mounted in the lower mold. The plurality of anode terminals are joined to respective anode leads extending outwardly from a plurality of capacitor elements, and the plurality of cathode terminals are coated with a thermosetting conductive adhesive, on which cathode layers of the plurality of capacitor elements are placed. When a pressure is applied to the plurality of capacitor elements by moving the upper mold toward the lower mold, a portion of the conductive adhesive is squeezed out of one surface of each of the plurality of capacitor elements to a neighboring side surface thereof, thus causing the conductive adhesive to have substantially a uniform thickness. Thereafter, the plurality of cathode terminals and the associated cathode layers of the plurality of capacitor elements are joined together by heat-curing the conductive adhesive.

The apparatus of the above-described construction facilitates the manufacture of the tantalum solid electrolytic capacitors and improves the quality thereof.

The upper mold moves up and down relative to the lower mold. Alternatively, the upper mold is hingedly connected to the lower mold so as to pivot about a fulcrum. Such movement of the upper mold simplifies the construction of the apparatus and enhances the reliability of the apparatus.

Advantageously, a water-repellent and heat-resistant sheet is attached to the upper surface of the lower mold. This sheet acts to prevent the cathode terminals from being bonded to the lower mold, even if the conductive adhesive is expelled from the cathode terminals, thus avoiding a reduction in productivity.

Again advantageously, a heat-resistant elastic material is attached to the lower surface of the upper mold. The elastic material allows the capacitor elements to be appropriately pressed without directly applying the pressure thereto.

It is preferred that a heater be mounted in the upper mold. The heater in the upper mold acts to prevent heat from radiating from the upper mold and to reduce the time required to reach the temperature at which the adhesive is cured.

It is also preferred that a thermal insulating panel be disposed adjacent to the lower mold so as to confront a side surface thereof. The thermal insulating panel acts to prevent heat radiation from a heat source and to stabilize the temperature of the lower mold.

Advantageously, a load regulating mechanism is provided for regulating a load to press the upper mold against the lower mold. The load regulating mechanism acts to optimize the load or pressure applied to the capacitor elements without damaging them.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

This application is based on an application No. 11-329496 filed Nov. 19, 1999 in Japan, the content of which is herein expressly incorporated by reference in its entirety.

Figure 1:
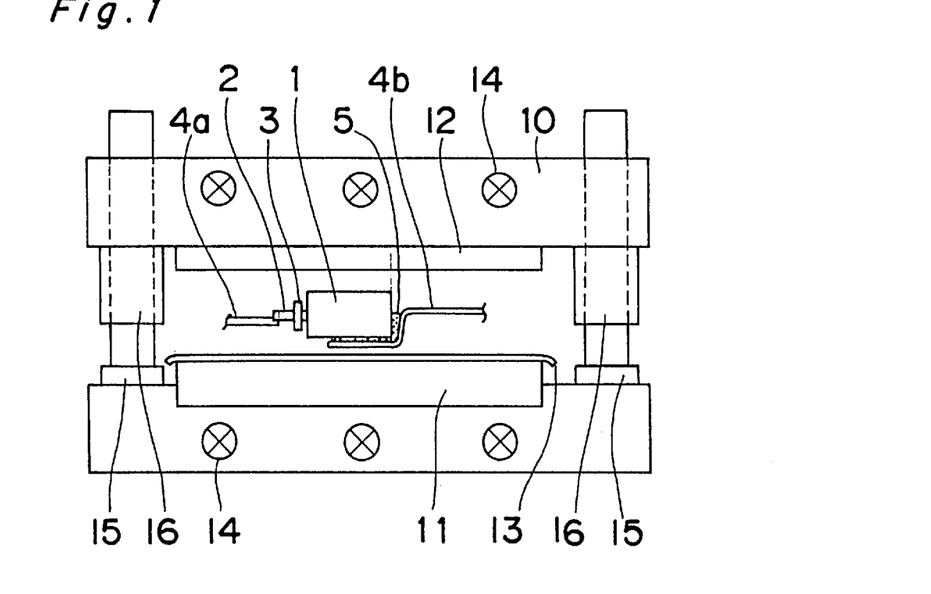
FIG. 1 is a front view of an apparatus for manufacturing tantalum solid electrolytic capacitors according to a first embodiment of the present invention.

FIG. 1 depicts an apparatus for manufacturing tantalum solid electrolytic capacitors according to a first embodiment of the present invention. In FIG. 1, reference numeral 1 denotes a capacitor element, in which a dielectric oxide layer, a solid electrolytic layer made of manganese dioxide and a cathode layer are formed on a surface of a sintered porous body formed of powder of tantalum metal, one of valve action metals. An anode lead 2 is partially embedded in and extends outwardly from the capacitor element 1, and a Teflon-made insulating plate 3 is mounted on the anode lead 2. An anode terminal 4a is connected to the anode lead 2, and a cathode terminal 4b is electrically connected to the cathode layer of the capacitor element 1. Both the anode terminal 4a and the cathode terminal 4b are cut off from a length of lead frame (comb-shaped terminal). A thermosetting conductive adhesive 5 is coated on the cathode terminal 4b. In this embodiment, "EN-40839K3" manufactured by Hitachi Chemical Co., Ltd., in which an epoxy-based resin contains 60~75% of conductive filler and is added with an increased amount of accelerator, is used for the conductive adhesive 5.

The apparatus shown in FIG. 1 includes a top force or upper mold 10, a bottom force or lower mold 11 spaced from the upper mold 10, an elastic material 12 attached to the lower surface of the upper mold 10, a water-repellent and heat resistant sheet 13 such, for example, as a Teflon sheet attached to the upper surface of the lower mold 11, heaters 14 mounted in the upper mold 10 and the lower mold 11, respectively, and a load regulating mechanism 15, 16 disposed on respective sides of the apparatus for regulating a load or pressure with which the upper mold is pressed against the lower mold 11. A heat-resistant silicone rubber having a rubber hardness of 5 to 15 under JIS K6249 is preferably used for the elastic material 12. The amount of displacement of the elastic material 12 is regulated or controlled in the range of 0.8 to 1.0 mm by the load regulating mechanism 15, 16 so that an optimum load of 50 to 25 grams apiece may be applied to a plurality of capacitor elements 1 placed on the lower mold 11. The load regulating mechanism 15,16 employs air, oil, springs or the like to output a desired load or force. The heater 14 may be mounted in only the lower mold 11.

The tantalum solid electrolytic capacitors are manufactured in the following manner using the apparatus of the above-described construction.

A length of plated metallic lead frame having a plurality of anode terminals 4a and the same number of cathode terminals 4b as the anode terminals 4a is first coated with the thermosetting conductive adhesive 5 at regular intervals (at locations where the cathode terminals 4b are provided). Cathode layers (not shown) of a plurality of capacitor elements 1 are then placed one after another on respective spots of the conductive adhesive. At the same time, an anode lead 2 extending outwardly from each capacitor element 1 is placed on the respective anode terminal 4a and joined thereto by welding. Subsequently, under the condition in which the capacitor elements 1 are pressed from above via the upper mold 10, the cathode terminals 4b and the associated cathode layers of the capacitor elements 1 are joined together by heat-curing the conductive adhesive 5 at a temperature of 180±5° C. for 30 to 60 seconds. At this moment, because the Teflon sheet 13 is applied to the surface of the lower mold 11 that is held in contact with the cathode terminals 4b, the bonding of the cathode terminals 5b and the lower mold 11 that may be caused by the squeeze-out of the conductive adhesive 5 can be prevented.

It is preferred that thermal insulating panels be disposed adjacent to the lower mold 11 so as to confront the side surfaces thereof. It is further preferred that the thermal insulating panels be disposed adjacent to both the upper and lower mold 10, 11 so as to confront the side surfaces thereof. Such thermal insulating panels act to restrain the radiation of heat, making it possible to enhance the efficiency of heat-curing the conductive adhesive 5.

Figure 2:
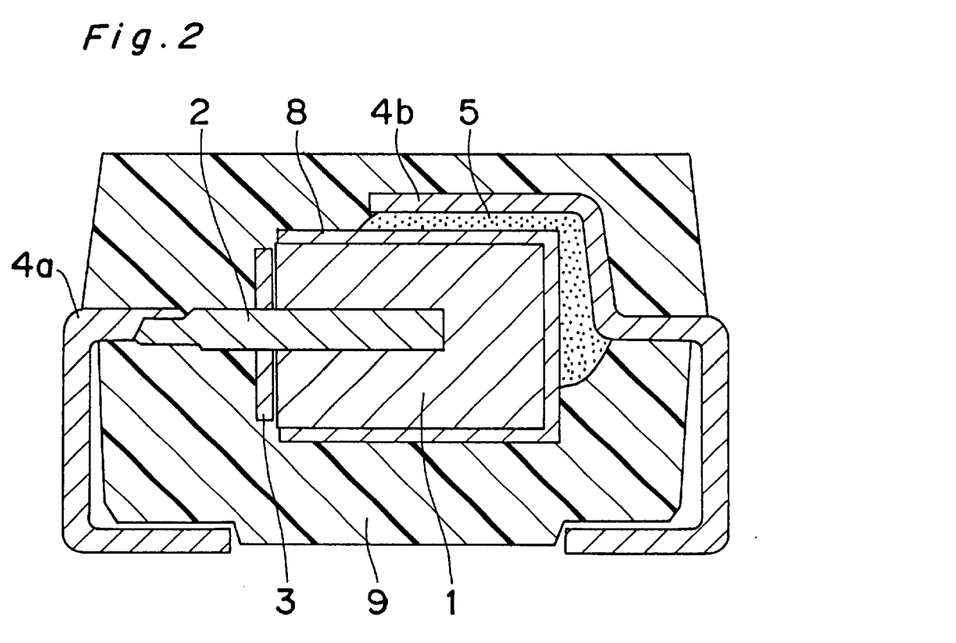
FIG. 2 is a sectional view of a tantalum solid electrolytic capacitor manufactured by the apparatus of FIG. 1.
Figure 3A:
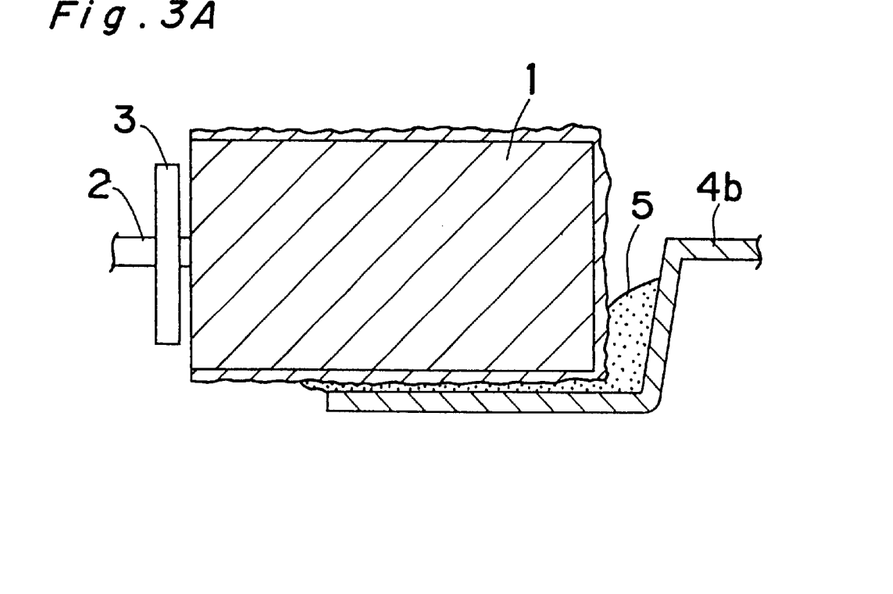
FIG. 3A is a sectional view of a main portion of the tantalum solid electrolytic capacitor of FIG. 2.
Figure 3B:
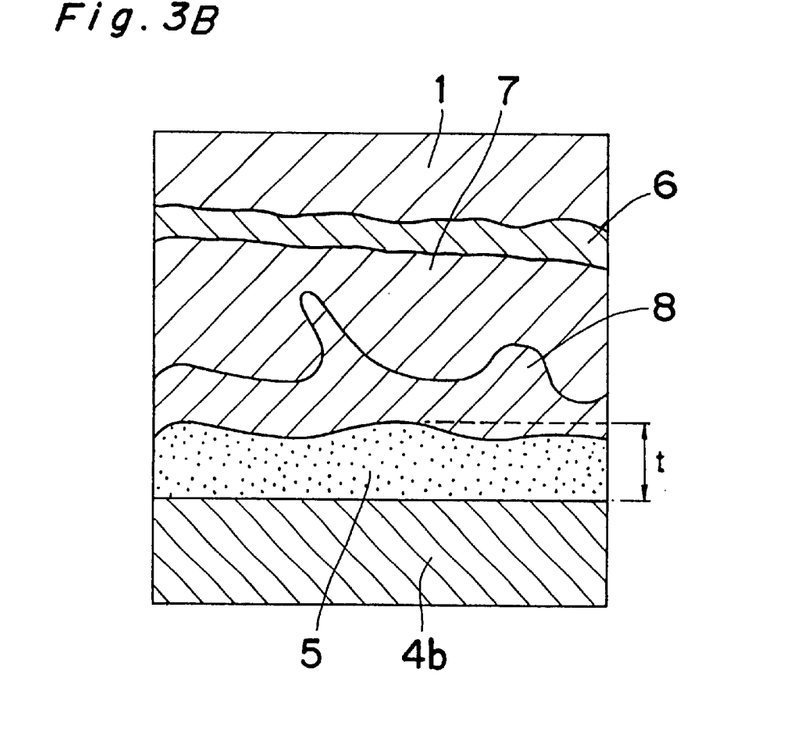
FIG. 3B is a sectional view, on an enlarged scale, of the main portion of FIG. 3A.

FIG. 2 and FIGS. 3A and 3B depict a tantalum solid electrolytic capacitor made by the above-described method. In these figures, reference numeral 1 denotes a capacitor element, reference numeral 2 denotes an anode lead, reference numeral 3 denotes an insulating plate, reference numerals 4a and 4b denote an anode terminal and a cathode terminal, respectively, reference numeral 5 denotes a conductive adhesive, reference numeral 6 denotes a dielectric oxide layer, reference numeral 7 denotes a solid electrolyte layer such as manganese dioxide, reference numeral 8 denotes a cathode layer, and reference numeral 9 denotes a sheathing resin.

In the tantalum solid electrolytic capacitor of the above-described construction, while the capacitor element 1 is held in pressure contact with the cathode terminal 4b, the curing of the conductive adhesive 5 is carried out. As a result, the conductive adhesive 5 becomes uniformly thin such as to have a thickness (t) of, for example, 80 $\mu$m, and a portion thereof is squeezed out of one surface of the capacitor element 1 to the neighboring side surface thereof, thus increasing the bonding area between the capacitor element 1 and the cathode terminal 4b. In addition, the application of pressure expels air from between the capacitor element 1 and the conductive adhesive 5 to thereby remove the air bubble portions such as shown in FIGS. 10A and 10B from the bonding area, making it possible to enhance the degree to which the capacitor element 1 and the cathode terminal 4b are connected to each other. It is preferred that the conductive adhesive 5 has a thickness smaller than 100 $\mu$m after the application of the pressure.

Figure 4:
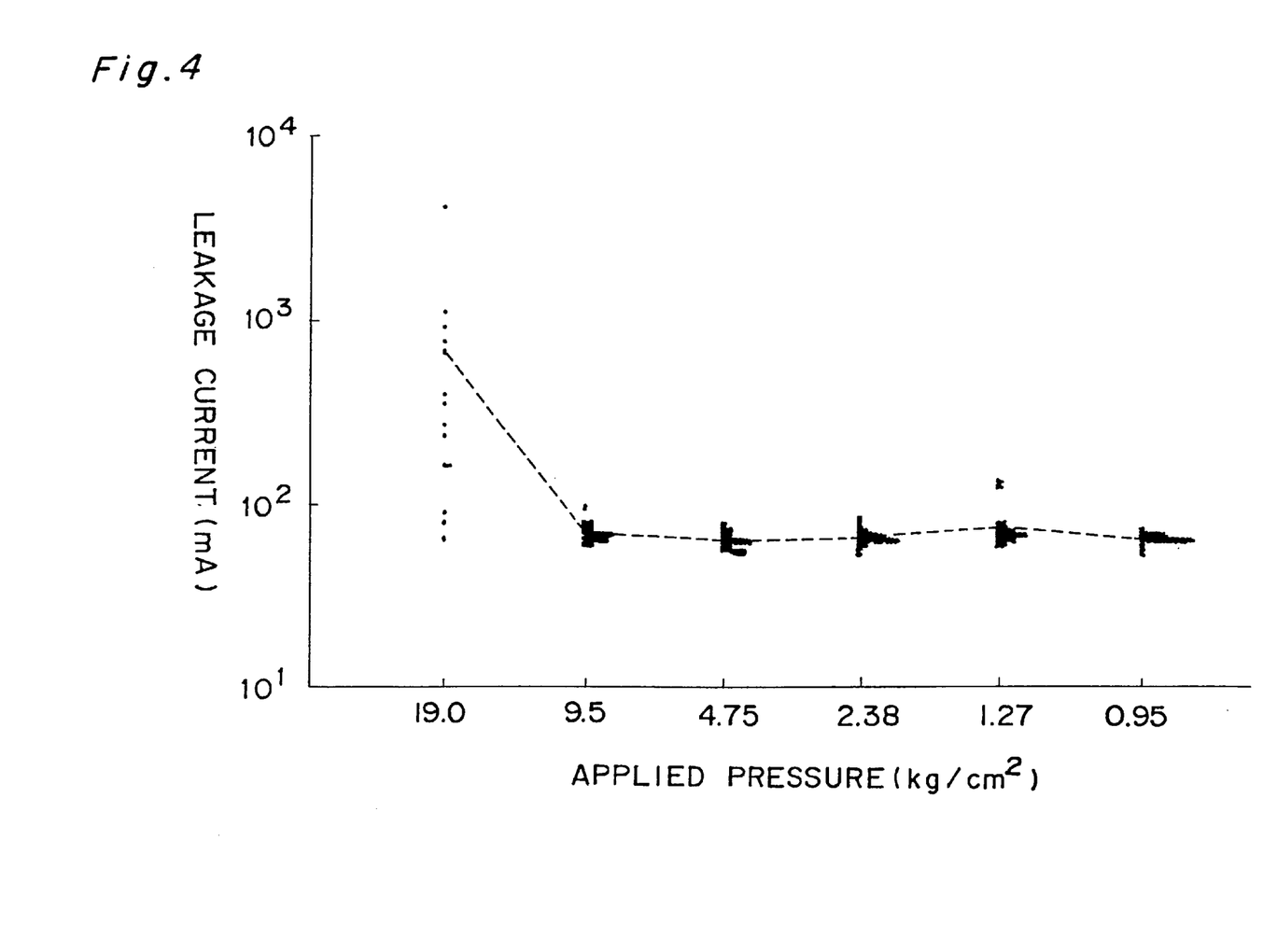
FIG. 4 is a graph showing a change in leakage current with respect to the pressure applied to a capacitor element in the tantalum solid electrolytic capacitors manufactured by the apparatus of FIG. 1.
Figure 5:
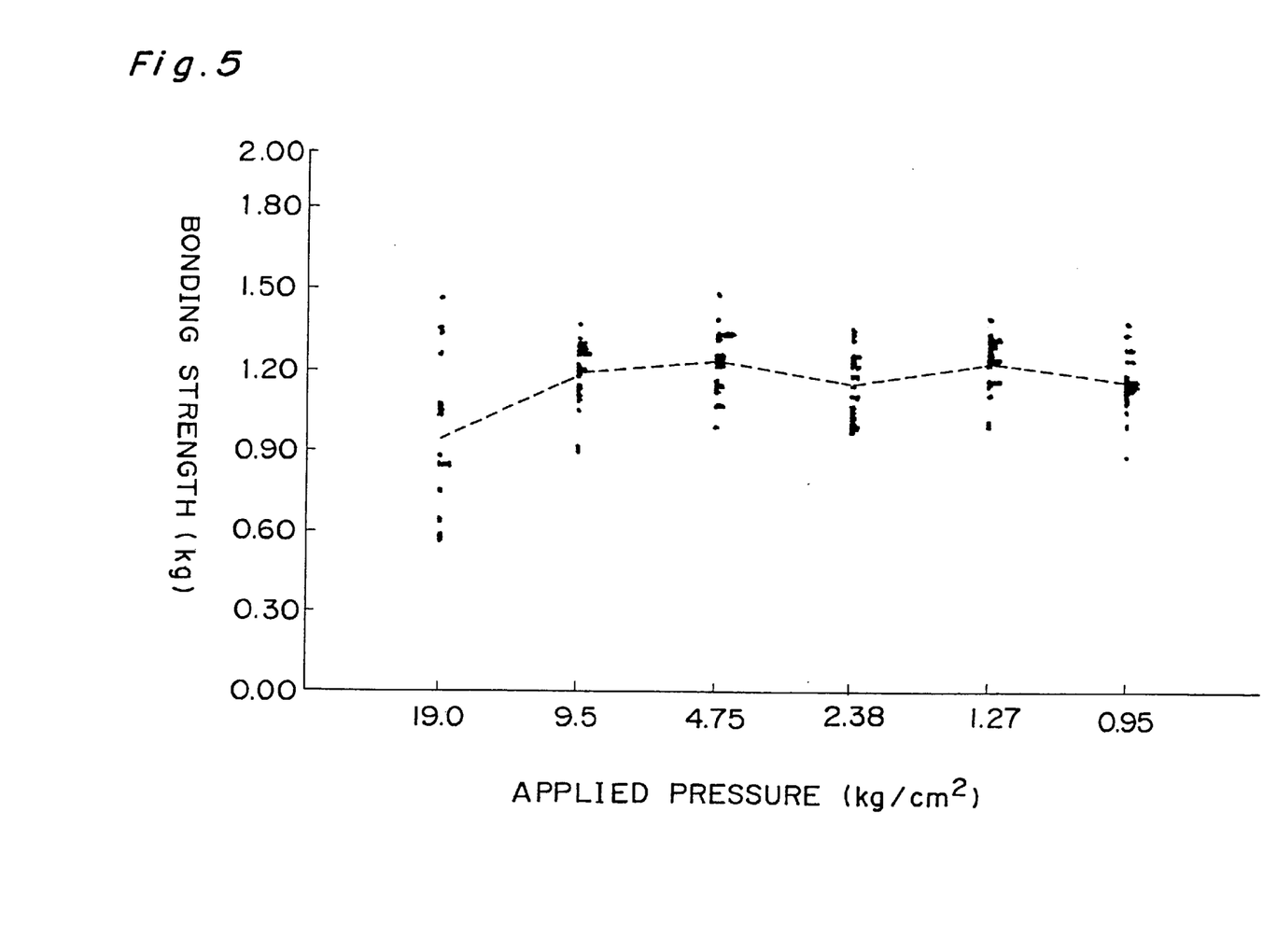
FIG. 5 is a graph showing a change in bonding strength with respect to the pressure applied to the capacitor element in the tantalum solid electrolytic capacitors manufactured by the apparatus of FIG. 1.

FIG. 4 depicts a change in leakage current characteristics caused by the application of pressure to the capacitor element, while FIG. 5 depicts a change in bonding strength between the capacitor element and the cathode terminal.

As can be seen from FIG. 4, the leakage current can be reduced and made substantially constant by setting the pressure applied to the capacitor element in the range of 2 to 9.5 kglcm$^2$.

If the pressure is lower than 2 kglcm2, it is not possible to sufficiently squeeze the conductive adhesive 5 to the side surface of the capacitor element 1 or sufficiently prevent generation of the air bubble portions. As a result, slightly large leakage currents sometimes occur and, hence, the pressure setting lower than 2 kglcm$^2$ is not preferable.

On the other hand, the application of a pressure over 9.5 kglcm$^2$ causes residual stress in the capacitor element 1, thus deteriorating the leakage current characteristics.

As can be seen from FIG. 5, if the pressure applied to the capacitor element 1 is lower than 9.5 kglcm$^2$, the bonding strength between the capacitor element 1 and the cathode terminal 4b is substantially stable. However, if the pressure exceeds 9.5 kglcm2, the cathode layer 8 formed on the capacitor element 1 is partially damaged or broken, thus considerably reducing the bonding strength.

Figure 6:
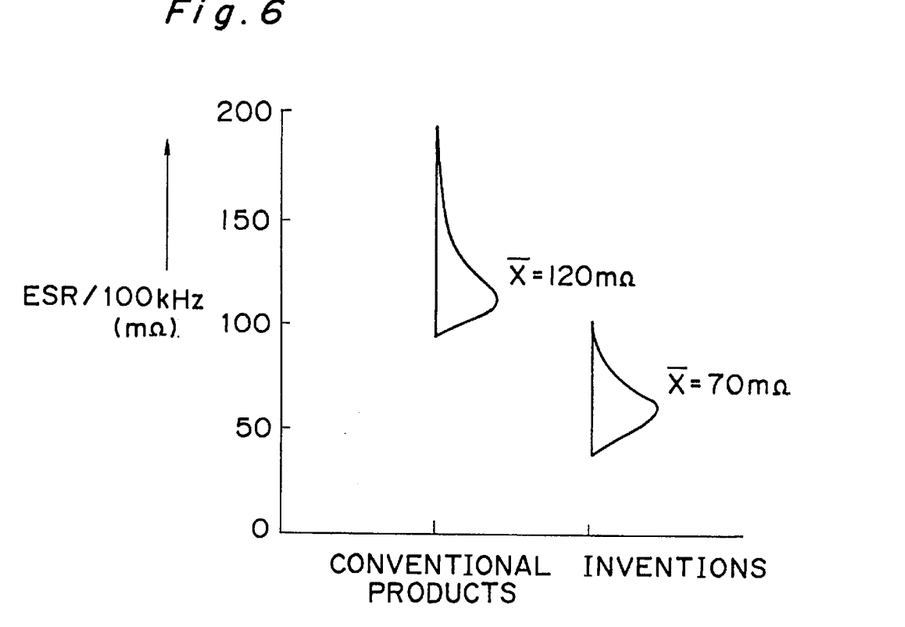
FIG. 6 is a graph showing the equivalent series resistance of products according to the present invention and that of conventional products.

FIG. 6 is a graph for comparing the equivalent series resistance (ESR 5 measured at 100 kHz) of the tantalum solid electrolytic capacitors manufactured in this embodiment with that of the conventional ones. The capacitance of samples was 10v100 $\mu$F and had a size 7343 (EIAJ code). A total of 200 samples were measured for each capacitor. As is clear from this graph, the average ESR value of 200 conventional capacitors is 120 m$\Omega$, while that of 200 capacitors according to the present invention is improved to 70 m$\Omega$.

Also, in the tantalum solid electrolytic capacitors according to the present invention, the use of the conductive adhesive added with an increased amount of accelerator completed the curing within a very short time. By way of example, in manufacturing 100,000 capacitors of a size 7343 (EIAJ code), the batch processing in the conventional manufacturing method requires about 6 hours for the curing of the conductive adhesive, whereas the apparatus according to the present invention, when combined with the conventional assembly machine, can perform continuous production, making it possible to enhance the productivity.

Figure 7:
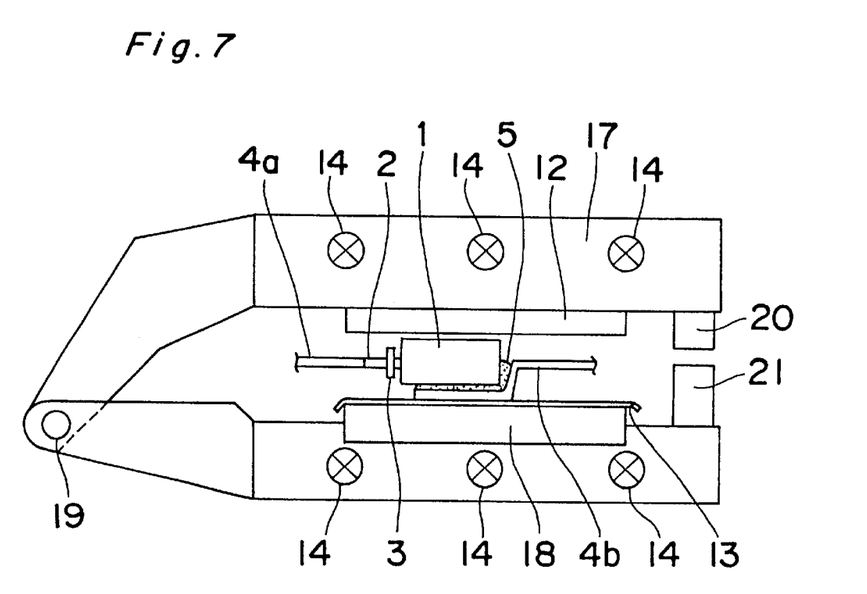
FIG. 7 is a view similar to FIG. 1, but depicting an apparatus according to a second embodiment of the present invention.
Figure 8:
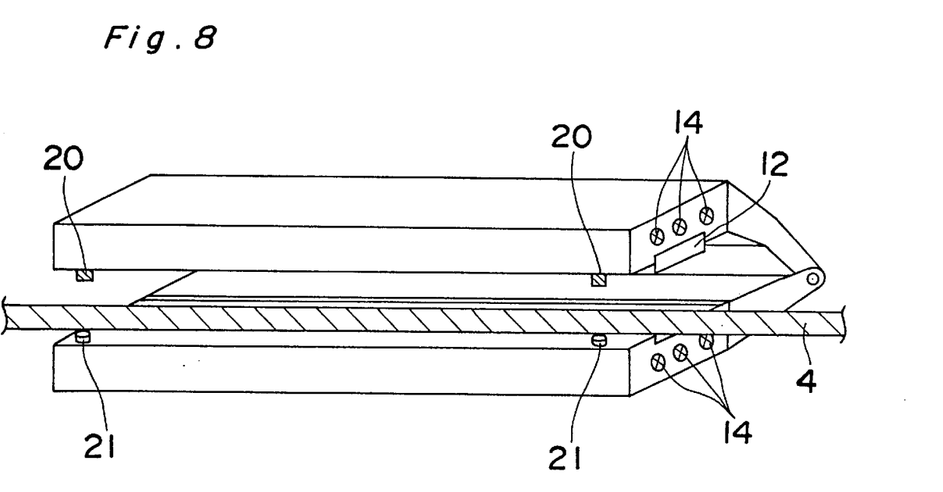
FIG. 8 is a is a perspective view of the apparatus of FIG. 7.

FIGS. 7 and 8 depict an apparatus for manufacturing tantalum solid electrolytic capacitors according to a second embodiment of the present invention.

The apparatus according to the first embodiment of the present invention is constructed ouch that the upper mold moves up and down relative to the lower mold, while the apparatus according to the second embodiment of the present invention is constructed such that an upper mold 17 is hingedly connected to a lower mold 18 so as to pivot about a fulcrum 19. A load regulating mechanism 20, 21 is disposed at distal ends of the upper and lower molds 17, 18 remote from the fulcrum 19. Because the construction other than the above is the same, explanation thereof is omitted.

FIG. 8 depicts the manner in which a length of lead frame 4 having the anode terminals 4a and the cathode terminals 4b integrally formed with each other extended between the upper and lower molds 17, 18, and a plurality of capacitor elements placed thereon at regular intervals are bonded thereto simultaneously.

The operation and effects of the apparatus according to the second embodiment of the present invention are substantially the same as those of the apparatus according to the first embodiment of the present invention.

As is clear from the above, according to the present invention, the capacitor elements are first placed on the conductive adhesive coated on the cathode terminals, and the conductive adhesive is heat-cured under the condition in which the capacitor elements are held under pressure. Accordingly, the conductive adhesive held in contact with one surface of each capacitor element is partially moved to a neighboring surface thereof, thus enlarging the bonding area and increasing the bonding strength. Furthermore, the thickness of the conductive adhesive layer is made uniformly thin, and generation of air bubbles inside the capacitors is prevented, making it possible to provide reliable tantalum solid electrolytic capacitors having a stable performance. Also, the use of a quick-drying conductive adhesive enhances the workability, and a combination of such adhesive with the apparatus according to the present invention simplifies the assembling processes.

Although the present invention have been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein. and scope of the present invention, they should be construed as being included therein.

What is claimed is:

1. An apparatus for manufacturing solid tantalum electrolytic capacitors, comprising: a lower mold having an upper surface constructed and arranged to receive a length of a metallic frame having plural anode terminals and plural cathode terminals, wherein the plural anode terminals are to be joined to respective anode leads extending outwardly from plural capacitor elements, and the plural cathode terminals are coated with a thermosetting conductive adhesive onto which surfaces of the plural capacitor elements are placed;

an upper mold mounted on said lower mold and having a lower surface spaced from said upper surface of said lower mold; and a heater mounted in said lower mold, such that when a pressure is applied to the plural capacitor elements, via said lower surface of said upper mold, by moving said upper mold towards said lower mold, a portion of the thermosetting conductive adhesive is squeezed from between the plural cathode terminals and the surfaces of the plural capacitor elements to respective adjacent side surfaces of the plural capacitor elements, whereby the thermosetting conductive adhesive remaining between the plural cathode terminals and the surfaces of the plural capacitor elements achieves a substantially uniform thickness, and such that when said heater is activated the plural cathode terminals and the capacitor elements become joined together by heat-curing of the thermosetting conductive adhesive.

2. The apparatus according to claim 1, wherein said upper mold is slidably connected to said lower mold so as to move up and down relative to said lower mold.

3. The apparatus according to claim 2, further comprising a water-repellant and heat-resistant sheet attached to said upper surface of said lower mold.

4. The apparatus according to claim 2, further comprising a heat-resistant elastic material attached to said lower surface of said upper mold.

5. The apparatus according to claim 2, further comprising a heater mounted in said upper mold.

6. The apparatus according to claim 2, further comprising a thermal insulating panel disposed adjacent to said lower mold so as to confront a side surface thereof.

7. The apparatus according to claim 2, further comprising a load regulating mechanism for regulating a load to press said upper mold against the plural capacitor elements when the plural capacitor elements are supported by said upper surface of said lower mold.

8. The apparatus according to claim 1, wherein said upper mold is wingedly connected to said lower mold so as to be pivotable about a fulcrum relative to said lower mold.

9. The apparatus according to claim 8, further comprising a water-repellant and heatresistant sheet attached to said upper surface of said lower mold.

10. The apparatus according to claim 8, further comprising a heat-resistant elastic material attached to said lower surface of said upper mold.

11. The apparatus according to claim 8, further comprising a heater mounted in said upper mold.

12. The apparatus according to claim 8, further comprising a thermal insulating panel disposed adjacent to said lower mold so as to confront a side surface thereof.

13. The apparatus according to claim 8, further comprising a load regulating mechanism for regulating a load to press said upper mold against the plural capacitor elements when the plural capacitor elements are supported by said upper surface of said lower mold.

14. The apparatus according to claim 1, further comprising a water-repellant and heat-resistant sheet attached to said upper surface of said lower mold.

15. The apparatus according to claim 1, further comprising a heat-resistant elastic material attached to said lower surface of said upper mold.

16. The apparatus according to claim 1, further comprising a heater mounted in said upper mold.

17. The apparatus according to claim 1, further comprising a thermal insulating panel disposed adjacent to said lower mold so as to confront a side surface thereof.

18. The apparatus according to claim 1, further comprising a load regulating mechanism for regulating a load to press said upper mold against the plural capacitor elements when the plural capacitor elements are supported by said upper surface of said lower mold.

19. An apparatus for manufacturing solid tantalum electrolytic capacitors, comprising:

a lower mold having an upper surface constructed and arranged to receive a length of a metallic frame having plural anode terminals and plural cathode terminals, wherein the plural anode terminals are to be joined to respective anode leads extending outwardly from plural capacitor elements, and the plural cathode terminals are coated with a thermosetting conductive adhesive onto which surfaces of the plural capacitor elements are placed;

an upper mold mounted on said lower mold for up and down movement relative thereto, said upper mold having a lower surface spaced from said upper surface of said lower mold;

a water-repellant and heat-resistant sheet attached to said upper surface of said lower mold;

a heat-resistant elastic material attached to said lower surface of said upper mold;

a thermal insulating panel disposed adjacent to said lower mold so as to confront a side surface thereof;

a load regulating mechanism for regulating a load to press said upper mold against the plural capacitor elements when the plural capacitor elements are supported by said upper surface of said lower mold;

a heater mounted in said upper mold; and a heater mounted in said lower mold, such that when a pressure is applied to the plural capacitor elements, via said heat-resistant elastic material, by moving said upper mold towards said lower mold, a portion of the thermosetting conductive adhesive is squeezed from between the plural cathode terminals and the surfaces of the plural capacitor elements to respective adjacent said surfaces of the plural capacitor elements, whereby the thermosetting conductive adhesive remaining between the plural cathode terminals and the surfaces of the plural capacitor elements achieves a substantially uniform thickness, and such that when said heaters are activated the plural cathode terminals and the capacitor elements become joined together by heat-curing of the thermosetting conductive adhesive.

20. An apparatus for manufacturing solid tantalum electrolytic capacitors, comprising:

a lower mold having an upper surface constructed and arranged to receive a length of a metallic frame having plural anode terminals and plural cathode terminals, wherein the plural anode terminal are to be joined to respective anode leads extending outwardly from plural capacitor elements, and the plural cathode terminals are coated with a thermosetting conductive adhesive onto which surfaces of the plural capacitor elements are placed;

an upper mold mounted on said lower mold for pivotal movement relative thereto, said upper mold having a lower surface spaced from said upper surface of said lower mold;

a water-repellant and heat-resistant sheet attached to said upper surface of said lower mold;

a heat-resistant elastic material attached to said lower surface of said upper mold;

a thermal insulating panel disposed adjacent to said lower mold so as to confront a side surface thereof, a load regulating mechanism for regulating a load to press said upper mold against the plural capacitor elements when the plural capacitor elements are supported by said upper surface of said lower mold;

a heater mounted in said upper mold; and a heater mounted in said lower mold, such that when a pressure is applied to the plural capacitor elements, via said heat-resistant elastic material, by moving said upper mold towards said lower mold, a portion of the thermosetting conductive adhesive is squeezed from between the plural cathode terminals and the surfaces of the plural capacitor elements to respective adjacent side surfaces of the plural capacitor elements, whereby the thermosetting conductive adhesive remaining between the plural cathode terminals and the surfaces of the plural capacitor elements achieves a substantially uniform thickness, and such that when said heaters are activated the plural cathode terminals and the capacitor elements become joined together by heat-curing of the thermosetting conductive adhesive.

* * * * *

UNITED STATES PATENT AND TRADEMARK OFFICE
CERTIFICATE OF CORRECTION

PATENT NO.     : 6,613,190 B2
DATED          : September 2, 2003
INVENTOR(S)    : Minoru Omori et al.

It is certified that error appears in the above-identified patent and that said Letters Patent is hereby corrected as shown below:

<u>Column 8,</u>
Line 37, please replace "heatresistant" with -- heat resistant --.

<u>Column 9,</u>
Line 34, please replace "said" with -- side --.

<u>Column 10,</u>
Line 4, please replace "terminal" with -- terminals --.

Signed and Sealed this

Twenty-fourth Day of February, 2004

JON W. DUDAS
*Acting Director of the United States Patent and Trademark Office*